(12) United States Patent
Hsieh et al.

(10) Patent No.: US 9,760,143 B2
(45) Date of Patent: Sep. 12, 2017

(54) SWITCHING MODULE, RELATED SERVER DEVICE AND POWER SWITCHING METHOD

(71) Applicant: Wistron Corporation, New Taipei (TW)

(72) Inventors: Cheng-Kuang Hsieh, New Taipei (TW); Han-Chieh Kuan, New Taipei (TW)

(73) Assignee: Wistron Corporation, New Taipei (TW)

( * ) Notice: Subject to any disclaimer, the term of this patent is extended or adjusted under 35 U.S.C. 154(b) by 147 days.

(21) Appl. No.: 14/835,742

(22) Filed: Aug. 26, 2015

(65) Prior Publication Data

US 2016/0313775 A1 Oct. 27, 2016

(30) Foreign Application Priority Data

Apr. 27, 2015 (TW) .............................. 104113361 A

(51) Int. Cl.
*G06F 1/00* (2006.01)
*G06F 1/30* (2006.01)
*G06F 1/26* (2006.01)

(52) U.S. Cl.
CPC ................ *G06F 1/30* (2013.01); *G06F 1/263* (2013.01); *G06F 1/305* (2013.01)

(58) Field of Classification Search
CPC ..... G06F 1/30; G06F 1/22; G06F 1/26; G06F 1/263; G06F 1/266; G06F 1/28; G06F 1/305
See application file for complete search history.

(56) References Cited

U.S. PATENT DOCUMENTS

| | | | | |
|---|---|---|---|---|
| 9,047,076 B1* | 6/2015 | Lee | ........................... | G06F 1/30 |
| 2006/0069931 A1* | 3/2006 | Shin | ...................... | G06F 1/3203 |
| | | | | 713/300 |
| 2007/0058279 A1* | 3/2007 | Duerk | ................... | G11B 19/20 |
| | | | | 360/69 |

FOREIGN PATENT DOCUMENTS

CN 104345854 A * 2/2015

OTHER PUBLICATIONS

Office action dated Nov. 16, 2015 for the Taiwan application No. 104113361, filing date: Apr. 27, 2015, p. 1 line 7-14, p. 2 and p. 3 line 1-20.

* cited by examiner

*Primary Examiner* — Bryce Bonzo
*Assistant Examiner* — Anthony J Amoroso
(74) *Attorney, Agent, or Firm* — Winston Hsu

(57) ABSTRACT

A switching module for a server device includes a switching unit, for generating a first power and a second power to a power converting module of the server device according to an external power and an interrupt signal, wherein the power converting module generates a plurality of supply powers to a plurality of computing modules in the server device according to the first power and generates a storage power to a storage module of the server device according to the second power; and a detecting unit, for generating the interrupt signal to the switching unit and the storage module according to the external power; wherein the detecting unit adjusts the interrupt signal to make the switching unit stop outputting the first power, generate the second power according to a backup power and make the storage module stores data under processing when detecting the external power works abnormally.

11 Claims, 2 Drawing Sheets

SWITCHING MODULE, RELATED SERVER DEVICE AND POWER SWITCHING METHOD

BACKGROUND OF THE INVENTION

1. Field of the Invention

The present invention relates to a switching module and related server device and power switching method, and more particularly, to a switching module capable of allowing a storage module of a sever device to store data when an external power works abnormally and related server device and power switching method.

2. Description of the Prior Art

With advances in the communication technology, users can rapidly read and store required information via a network with a low latency. Under such a condition, the information may be stored in remote servers and does not required to be stored in the personal computer. When needing to use (e.g. read or edit) the information, the user downloads the information via the network to the personal computer. The cost on the storage device therefore can be reduced. Furthermore, the information can be on-line edited by multiple users via storing the information on the remote server. Even if the multiple users locate at difference places, the multiple users can work together and the costs and time spend on the commute can be decreased. In addition, the user also can synchronize the information stored in difference places (e.g. in the office and home) via storing the information in the remote servers. The user can use the information of the latest version in different places. The abovementioned service is also called cloud service.

Along with advances in the cloud computing, various kinds of cloud service and cloud application are applied in daily life. In response to the rising number of users and service requirements, numerous companies purchase and configure a significant number of servers (i.e. the remote servers) to store the significant amount of user information. During operations of the servers, the data stored in the servers may be loss or broken if an external power of the server works abnormally (e.g. the external power is removed or during a power cut). Thus, how to control the server to store the data under processing when the external power of the server works abnormally becomes a topic to be discussed.

SUMMARY OF THE INVENTION

In order to solve the above problem, the present invention provides a switching module capable of allowing a storage module of a sever device to store data when an external power works abnormally and related server device and power switching method.

The present invention discloses a switching module for a server device. The switching module comprises a switching unit, for generating a first power and a second power to a power converting module of the server device according to an external power and an interrupt signal, wherein the power converting module generates a plurality of supply powers to a plurality of computing modules in the server device according to the first power and generates a storage power to a storage module of the server device according to the second power; and a detecting unit, for generating the interrupt signal to the switching unit and the storage module according to the external power; wherein the detecting unit adjusts the interrupt signal to make the switching unit stop outputting the first power, generate the second power according to a backup power and make the storage module stores data under processing when detecting the external power works abnormally.

The present invention further discloses a server device. The server device comprises a plurality of computing modules; a storage module; a power converting module, for generating a plurality of supply voltages to the plurality of computing modules according to a first power, and generating a storage power to the storage module according to a second power; a power storage module, for providing a back-up power; and a switching module, comprising a switching unit, for generating the first power and the second power to the power converting module according to an external power and an interrupt signal; and a detecting unit, for generating the interrupt signal to the switching unit and the storage module according to the external power; wherein the detecting unit adjusts the interrupt signal to make the switching unit stop outputting the first power, generate the second power according to the backup power and make the storage module stores data under processing when detecting the external power works abnormally.

The present invention further discloses a power switching method for a server device. The power switching method comprises converting an external power to generate a plurality of supply voltages to a plurality of computing modules of the server device and generate a storage power to a storage module of the server device; and detecting whether the external power works abnormally, to stop converting the external power, convert a back-up power to generate the storage power, and control the storage module to store data under processing when detecting the external power works abnormally.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
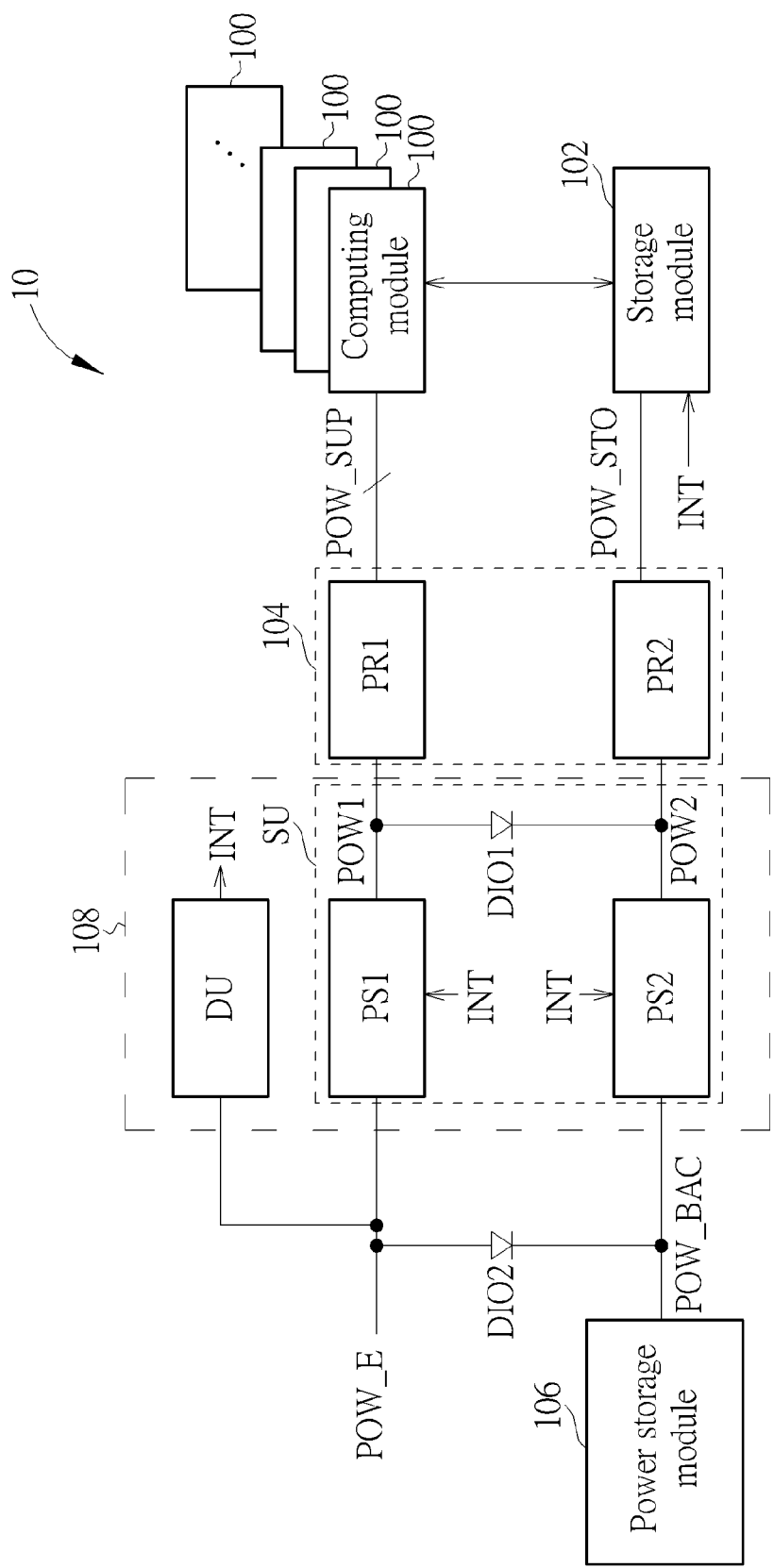
FIG. 1 is a schematic diagram of a server device according to an example of the present invention.

Please refer to FIG. 1, which is a schematic diagram of a server device 10 according to an example of the present invention. The server device 10 may be a server product such as a tower server, a rack server or a blade server, and is not limited herein. As shown in FIG. 1, the server device 10 comprises a plurality of computing modules 100, a storage module 102, a power converting module 104, a power storage module 106 and a switching module 108. The plurality of computing modules 100 comprise computing means such as microprocessors and redundant array of inexpensive disks control integrated circuits and are not limited herein. The storage module 102 may be a computer storage mean such as a solid state drive (SSD) or a hard-disk and is utilized for storing data required by the plurality of computing modules 100. The plurality of computing modules 100 are powered by a plurality of supply powers POW_SUP and the storage module 102 is powered by a storage power POW_STO. The power converting module 104 comprises power converting units PR1 and PR2, generates the plurality supply powers POW_SUP according to a power POW1, and generates the storage power POW_STO according to a power POW2. The power storage module 106 may be a power storage mean such as a battery or a super capacitor and is utilized for providing a back-up power POW_BAC. The switching module 108 comprises a switching unit SU and a detecting unit DU and is utilized for generating the powers POW1 and POW2 to the power converting module 104 according to an external power POW_E and generating an interrupt signal INT to the storage module 102. When the switching module 108 detects the external power POW_E works abnormally (e.g. the voltage of the external power POW_E drops to ground voltage or a connection between the external power POW_E and the server device 10 is removed), the switching module 108 stops generating the power POW1 and utilizes the back-up power POW_BAC to generate the power POW2. The switching module 108 simultaneously adjusts the interrupt signal INT to make the storage module 102 store data under processing. In other words, the storage module 102 can utilize the back-up power POW_BAC provided by the power storage module 106 to store the data under processing when the external power works abnormally, so as to prevent the data from loss or broken.

In details, the external power POW_E couples to the server device 10 via a connection unit (not shown in FIG. 1). The connection unit maybe a power connector, and is not limited herein. The switching unit SU comprises power switches PS1 and PS2 and a diode DIO1. The power switch PS1 is utilized for outputting the external power POW_E as the powers POW1 and POW2 according to the interrupt signal INT. The power switch PS2 is utilized for outputting the back-up power POW_BAC as the power POW2 according to the interrupt signal INT. The detecting unit DU is utilized for detecting whether the external power POW_E works normally (e.g. whether the voltage of the external power POW_E substantially keeps at a working voltage), to generate the interrupt signal INT.

When the external power POW_E works normally (e.g. the voltage of the external power POW_E keeps at a working voltage), the external power POW_E charges the power storage module 106 via a diode DIO2. According to the normal external power POW_E, the detecting unit DU adjusts the interrupt signal INT (e.g. to a high logic level), to make the power switch output the external power POW_E as the power POW1 and output the external power POW_E as the power POW2 via the diode DIO1, and to make the power switch PS2 stop operating. Under such a condition, the power converting units PR1 and PR2 of the power converting module 104 utilize the powers POW1 and POW2 generated from the external power POW_E to generate the plurality of supply powers POW_SUP and the storage power POW_STO to the plurality of computing modules 100 and the storage module 102.

When the external power POW_E works abnormally (e.g. the voltage of the external power POW_E drops to ground voltage or the connection between the external power POW_E and the server device 10 is removed), the external power POW_E stop charging the power storage module 106. According to the abnormal external power POW_E, the detecting unit DU adjusts the interrupt signal INT (e.g. to a low logic level), to make the power switch PS1 stop operating and to make the power switch PS2 output the back-up power POW_BAC as the power POW2. On the other hand, the storage module 102 stores the data under processing (e.g. the data stored in temporary storage components such as cache and non-volatile memory) when the interrupt signal INT is adjusted to the low-logic level. In other words, the detecting unit DU adjusts the interrupt signal INT when detecting the external power POW_E works abnormally, to make the storage module 102 utilize the back-up power POW_BAC to store the data under processing, so as to prevent the data from loss or broken.

According to different applications and design concepts, the detecting unit DU utilizes various structures and methods to transmit the interruption signal INT to the storage module 102. For example, the detecting unit DU may utilize an interaction unit (not shown in FIG. 1) between the storage module 102 and one of the plurality of computing module 100 (e.g. the redundant array of inexpensive disks control integrated circuit) to transmit the interrupt signal INT to the storage module 102. In an example, the interface unit utilized for transmitting the interrupt signal INT is a serial attached small computer system interface. In this example, the detecting unit DU utilizes a pin of transmitting a drive active signal and a disable staggered spin-up signal (e.g. the pin 11 of the serial attached small computer system interface) to transmit the interruption signal INT to the storage module 102.

In the above examples, the switching module 108 switches the power source outputted to the power converting module 106 and controls the storage module 102 to store the data under processing directly according to the external power POW_E. When the external power POW_E works abnormally, the storage module 102 stores the data under processing to avoid the data loss or broken. Since the server device 10 does not utilize the computing modules 100 to control the storage module 102 to store the data under processing when the external power POW_E works abnormally, the time of the power storage module 104 providing the back-up power POW_BAC is reduced. That is, both the power capacity of the power storage module 106 and the manufacture cost of the server device 10 are decreased. According to different applications and design concepts, those with ordinary skill in the art may observe appropriate alternations and modifications.

Figure 2:
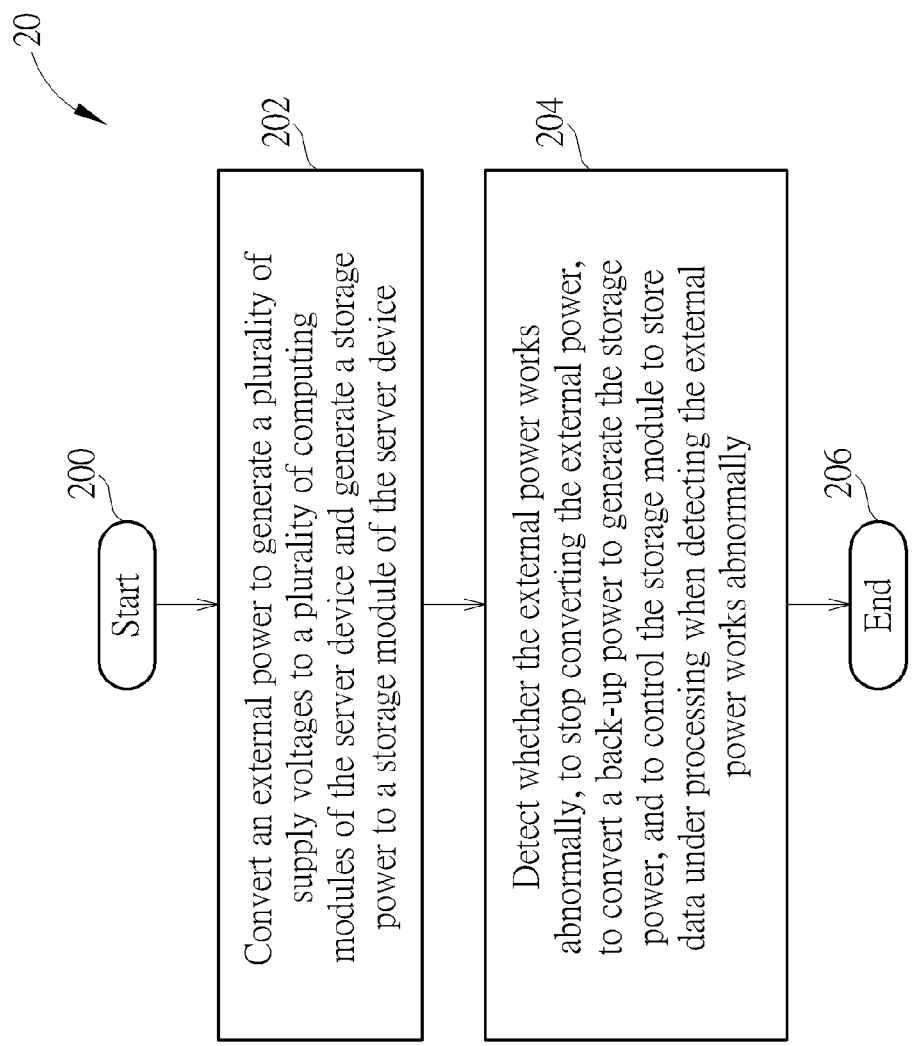
FIG. 2 is a flowchart of a power switching method according to an example of the present invention.

The process of the switching module 108 switching the power source outputted to the power converting module 104 and controlling the storage module 102 to store the data under processing can be summarized into a power switching method 20 shown in FIG. 2. The power switching method 20 can be utilized in a server device and comprises the following steps:

Step 200: Start.

Step 202: Convert an external power to generate a plurality of supply voltages to a plurality of computing modules of the server device and generate a storage power to a storage module of the server device.

Step 204: Detect whether the external power works abnormally, to stop converting the external power, to convert a back-up power to generate the storage power, and to control the storage module to store data under processing when detecting the external power works abnormally.

Step 206: End.

According to the power switching method 20, the server device first converts an external power, which works normally, to a plurality supply powers and to a storage power, so as to power a plurality of computing modules and a storage module of the server device, respectively. When converting the external power, the server device continuously detects whether the external power works normally. When the server device detects the external power works abnormally (e.g. a voltage of the external power drops to ground voltage or the connection between the external power and the server device is removed), the server device stops converting the external power and changes to convert a back-up power to generate the storage power. The back-up power may be provided by a power storage module (e.g. a battery or a super capacitor). At the same time, the server device generates an interruption signal to the storage module, to control the storage module to store the data under processing. In other words, the storage module utilizes the storage power converted from the back-up power to store the data under processing when the server device detects the external power works abnormally. Since the server device does not utilize the computing modules (e.g. the computing components such as the microprocessors and redundant array of inexpensive disks control integrated circuits) to control the storage module to store the data under processing but directly detecting the external power as the reference of controlling the storage module to store the data under processing, the storage module can rapidly store the data under processing when the external power works abnormally. The time of the power storage module providing the back-up power for the storage module storing the data under processing is therefore reduced. Under such a condition, the power capacity of the power storage module and the manufacture cost of the server device also can be decreased. The detailed operations of the power switching method 20 can be referred to the above and are not narrated herein for brevity.

To sum up, the server device of the above examples outputs the interrupt signal to the storage module via detecting whether the external power works normally, to rapidly control the storage module to store the data under processing when the external power works abnormally, such that the data can be prevented from missing or broken.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching module for a server device, the switching module comprising:
   a switching unit, for generating a first power and a second power to a power converting module of the server device according to an external power and an interrupt signal, wherein the power converting module generates a plurality of supply powers to a plurality of computing modules in the server device according to the first power and generates a storage power to a storage module of the server device according to the second power; and
   a detecting unit, for generating the interrupt signal to the switching unit and the storage module according to the external power;
   wherein the detecting unit adjusts the interrupt signal to make the switching unit stop outputting the first power, generate the second power according to a backup power and make the storage module stores data under processing when detecting the external power works abnormally.

2. The switching module of claim 1, wherein the detecting unit transmits the interrupt signal to the storage module via an interface unit between the storage module and one of the plurality of computing modules.

3. The switching module of claim 2, wherein the interface unit is a serial attached small computer system interface and the detecting unit transmits the interrupt signal to the storage module via a pin utilized for transmitting a drive active signal and a disable staggered spin-up signal in the serial attached small computer system interface.

4. The switching module of claim 1, wherein the switching unit comprises:
   a first power switch, for outputting the external power as the first power according to the interrupt signal;
   a diode, comprising an anode coupled to the first power and a cathode coupled to the second power; and
   a second power switch, for outputting the back-up power as the second power according to the interrupt signal.

5. A server device, comprising:
   a plurality of computing modules;
   a storage module;
   a power converting module, for generating a plurality of supply voltages to the plurality of computing modules according to a first power, and generating a storage power to the storage module according to a second power;
   a power storage module, for providing a back-up power; and
   a switching module, comprising:
     a switching unit, for generating the first power and the second power to the power converting module according to an external power and an interrupt signal; and
     a detecting unit, for generating the interrupt signal to the switching unit and the storage module according to the external power;
   wherein the detecting unit adjusts the interrupt signal to make the switching unit stop outputting the first power, generate the second power according to the backup power and make the storage module stores data under processing when detecting the external power works abnormally.

6. The server device of claim 5, wherein the detecting unit transmits the interrupt signal to the storage module via an interface unit between the storage module and one of the plurality of computing modules.

7. The server device of claim 6, wherein the interface unit is a serial attached small computer system interface and the detecting unit transmits the interrupt signal to the storage module via a pin utilized for transmitting a drive active signal and a disable staggered spin-up signal in the serial attached small computer system interface.

8. The server device of claim 5, wherein the switching unit comprises:
   a first power switch, for outputting the external power as the first power according to the interrupt signal;
   a diode, comprising an anode coupled to the first power and a cathode coupled to the second power; and
   a second power switch, for outputting the back-up power as the second power according to the interrupt signal.

9. A power switching method for a server device, the power switching method comprising:
   converting an external power to generate a first power and a second power, wherein a power converting module utilizes the first power to generate a plurality of supply voltages to a plurality of computing modules of the server device and utilizes the second power to generate a storage power to a storage module of the server device; and
   detecting whether the external power works abnormally, to stop converting the external power, to convert a back-up power to generate the second power, and to control the storage module to store data under processing when detecting the external power works abnormally.

10. The power switching method of claim 9, wherein the step of detecting whether the external power works abnormally, to stop converting the external power, convert the back-up power to generate the second power, and control the storage module to store the data under processing when detecting the external power works abnormally comprises:
transmitting an interrupt signal to the storage module via an interface unit between the storage module and one of the plurality of computing module, to control the storage module to store the data under processing.

11. The power switching method of claim 10, wherein the interface unit is a serial attached small computer system interface and the detecting unit transmits the interrupt signal to the storage module via a pin utilized for transmitting a drive active signal and a disable staggered spin-up signal in the serial attached small computer system interface.

* * * * *